US010422974B2

United States Patent
Kim et al.

(10) Patent No.: US 10,422,974 B2
(45) Date of Patent: Sep. 24, 2019

(54) LENS DRIVING DEVICE AND CAMERA MODULE INCLUDING THE SAME

(71) Applicant: SAMSUNG ELECTRO-MECHANICS CO., LTD., Suwon-si (KR)

(72) Inventors: Jung Woo Kim, Suwon-si (KR); Je Hyun Bang, Suwon-si (KR); Young Bok Yoon, Suwon-si (KR); Dong Yeon Shin, Suwon-si (KR); Hong Joo Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 12 days.

(21) Appl. No.: 15/849,756

(22) Filed: Dec. 21, 2017

(65) Prior Publication Data
US 2018/0356609 A1     Dec. 13, 2018

(30) Foreign Application Priority Data
Jun. 12, 2017   (KR) .................. 10-2017-0073250

(51) Int. Cl.
*G02B 7/04*  (2006.01)
*G02B 27/64* (2006.01)
*G03B 13/34* (2006.01)
*H02K 41/035* (2006.01)
*G03B 5/04*  (2006.01)
*G03B 3/10*  (2006.01)

(52) U.S. Cl.
CPC ............. *G02B 7/04* (2013.01); *G02B 27/646* (2013.01); *G03B 3/10* (2013.01); *G03B 5/04* (2013.01); *G03B 13/34* (2013.01); *H02K 41/0356* (2013.01); *G03B 2205/0015* (2013.01); *G03B 2205/0069* (2013.01)

(58) Field of Classification Search
None
See application file for complete search history.

(56) References Cited

U.S. PATENT DOCUMENTS

2005/0206735 A1   9/2005 Seo
2016/0025951 A1*  1/2016 Park .................... G02B 27/646
                                           359/824

(Continued)

FOREIGN PATENT DOCUMENTS

JP       4530691 B2     8/2010
JP     2012-177754 A    9/2012

(Continued)

OTHER PUBLICATIONS

Korean Office Action dated Jan. 10, 2019 in corresponding Korean Patent Application No. 10-2017-0073250 (7 pages in English, 5 pages in Korean).

*Primary Examiner* — William B Perkey
(74) *Attorney, Agent, or Firm* — NSIP Law (57) ABSTRACT

A camera module comprises a lens barrel, a lens driving device including a focusing unit moving a lens barrel in an optical axis direction and a movement correction unit moving the lens barrel in a direction perpendicular to the optical axis direction, and a housing accommodating the lens barrel and the lens driving device. A focus sensing portion of the focusing unit is disposed in an area not including a planar surface on which a focusing magnet and a focusing coil are mounted.

20 Claims, 7 Drawing Sheets

(56) References Cited

U.S. PATENT DOCUMENTS

| | | | |
|---|---|---|---|
| 2017/0139225 A1* | 5/2017 | Lim | G02B 27/646 |
| 2018/0149881 A1* | 5/2018 | Kim | G03B 13/36 |
| 2018/0284568 A1* | 10/2018 | Oh | G03B 5/00 |
| 2018/0299644 A1* | 10/2018 | Lee | G02B 7/28 |
| 2018/0356609 A1* | 12/2018 | Kim | G02B 7/04 |
| 2019/0011663 A1* | 1/2019 | Weng | G02B 7/09 |
| 2019/0041661 A1* | 2/2019 | Murakami | G02B 7/09 |

FOREIGN PATENT DOCUMENTS

| | | |
|---|---|---|
| JP | 2015-191213 A | 11/2015 |
| KR | 10-2013-0077216 A | 7/2013 |
| KR | 10-2017-0056387 A | 5/2017 |

* cited by examiner

LENS DRIVING DEVICE AND CAMERA MODULE INCLUDING THE SAME

CROSS-REFERENCE TO RELATED APPLICATIONS

This application claims the benefit under 35 USC § 119(a) of Korean Patent Application No. 10-2017-0073250, filed on Jun. 12, 2017 in the Korean Intellectual Property Office, the entire disclosure of which is incorporated herein by reference for all purposes.

BACKGROUND

1. Field

The following description relates to a lens driving device and to a camera module including the same.

2. Description of Related Art

In recent years, ultra-small camera modules have been employed in mobile communications terminals, such as smartphones, tablet PCs, and laptop computers.

In general, camera modules may include a lens barrel, having a lens provided therein, and a housing, accommodating the lens barrel therein, and an image sensor converting an image of a subject into an electrical signal. Camera modules may employ a single-focus camera module capturing images of objects with a fixed focus. However, recently, camera modules including an actuator having an auto focusing (AF) function have been employed, as technology has developed. In addition, camera modules may employ an actuator for an optical image stabilization (OIS) function, in order to reduce the phenomenon of resolution degradation caused by user hand-shake.

SUMMARY

This Summary is provided to introduce a selection of concepts that are further described below in the Detailed Description in simplified form. This Summary is not intended to identify key features or essential features of the claimed subject matter, nor is it intended to be used as an aid in determining the scope of the claimed subject matter.

In one general aspect, a camera module includes a lens barrel, a lens driving device including a focusing unit configured to move the lens barrel in a substantially optical axis direction and a movement correction unit configured to move the lens barrel in a direction substantially perpendicular to the optical axis direction, and a housing accommodating the lens barrel and the lens driving device, wherein the focusing unit includes a carrier accommodating the lens barrel, a focusing magnet mounted on the carrier or the housing, a focusing coil disposed to oppose the focusing magnet, a focus sensing portion having a focus sensing yoke and a focus sensing coil disposed to oppose the focus sensing yoke, and the focus sensing portion is disposed in an area not including a substantially planar surface on which the focusing magnet and the focusing coil are mounted.

The focus sensing portion may be disposed on a substantially planar surface configured to meet a substantially planar surface on which the focusing magnet and the focusing coil are mounted, at substantially a right angle. The movement correction unit may include a movement correction sensing portion including a movement correction sensing yoke and a movement correction sensing coil disposed to oppose the movement correction sensing yoke. The focus sensing portion may be disposed to be substantially coplanar with the movement correction sensing portion.

The focus sensing coil provided in the focus sensing portion may include two or more coil portions. The focus sensing yoke and the focus sensing coil of the focus sensing portion may be disposed to oppose each other in the substantially optical axis direction. The focus sensing portion may include a first focus sensing portion disposed in an upper portion of the housing and a second focus sensing portion, disposed to be spaced apart from the first focus sensing portion and below the first focus sensing portion. A rolling member may be disposed between the first focus sensing portion and the second focus sensing portion. The focus sensing portion may further include a connection substrate connected to a substrate connected to the focusing coil.

The movement correction unit may include a guide member configured to guide movement of the lens barrel and a movement correction driving portion configured to move the guide member in a direction substantially perpendicular to an optical axis. The guide member may include a frame mounted in the carrier and a lens holder mounted in the lens barrel. The movement correction driving portion may include a first movement correction driving portion configured to generate driving power in a first axis direction substantially perpendicular to the optical axis and a second movement correction driving portion configured to generate driving power in a second axis direction substantially perpendicular to both the optical axis and a first axis. The first movement correction driving portion may include a first movement correction magnet mounted on the frame or the housing and a first movement correction coil disposed to oppose the first movement correction magnet.

The second movement correction driving portion may include a second movement correction magnet mounted on the frame or the housing and a second movement correction coil disposed to oppose the second movement correction magnet. The movement correction unit may further include a plurality of rolling members configured to guide the frame and the lens holder.

A lens driving device includes a focusing unit configured to move a lens barrel in a substantially optical axis direction and a movement correction unit configured to move the lens barrel in a direction substantially perpendicular to the optical axis direction, the focusing unit includes a carrier accommodating the lens barrel, a focusing magnet mounted on a housing accommodating the carrier or the carrier, a focusing coil disposed to oppose the focusing magnet, a focus sensing portion having a focus sensing yoke and a focus sensing coil disposed to oppose the focus sensing yoke, and the focus sensing portion is disposed in an area not including a substantially planar surface on which the focusing magnet and the focusing coil are mounted.

The focus sensing portion may be disposed adjacent to a substantially planar surface on which the focusing magnet and the focusing coil are mounted. The focus sensing portion may be disposed on a substantially planar surface configured to meet a substantially planar surface on which the focusing magnet and the focusing coil are mounted, at substantially a right angle. The focus sensing portion may be disposed to be substantially coplanar with the movement correction sensing portion. The focus sensing coil provided in the focus sensing portion may include two or more coil portions.

Other features and aspects will be apparent from the following detailed description, the drawings, and the claims.

Throughout the drawings and the detailed description, the same reference numerals refer to the same elements. The drawings may not be to scale, and the relative sizes, proportions, and depictions of elements in the drawings may be exaggerated for the purpose of clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, embodiments will be described in further detail with reference to the accompanying drawings.

In an aspect, the description relates to a lens driving device and to a camera module including the lens driving device, and may be applied to portable electronic devices, such as a mobile communications terminal, a smartphone, and a tablet PC.

The camera module is provided as an optical device to capture still images or video footage. The camera module includes a lens, refracting light reflected from a subject, and a lens driving device moving the lens to be focused or to correct movement thereof.

Figure 1:
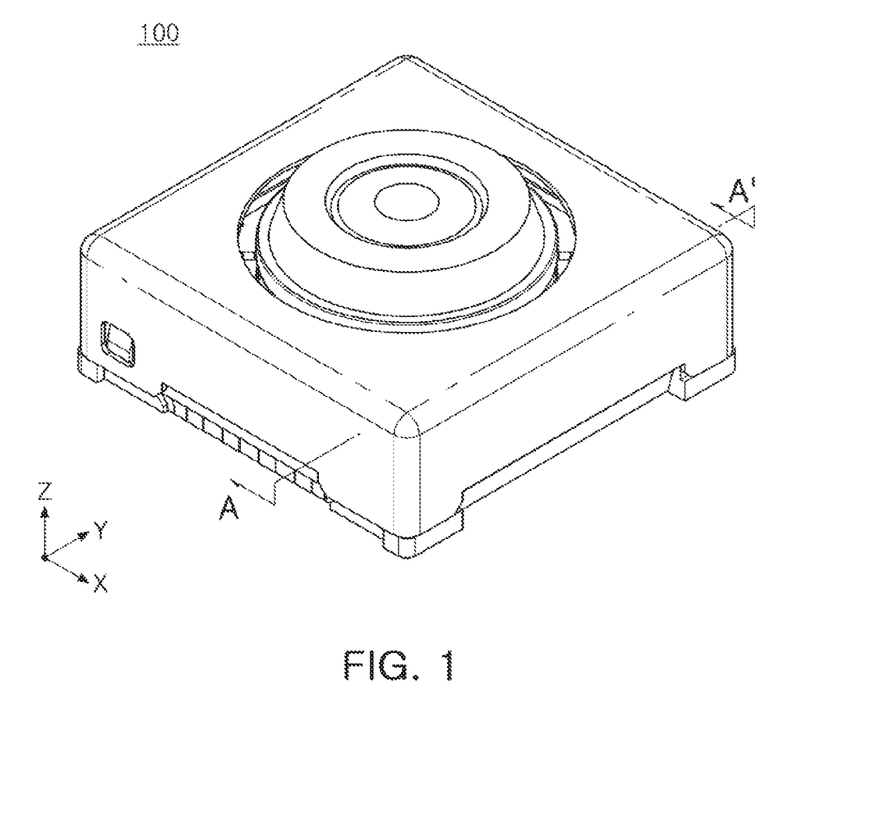
FIG. 1 is a perspective view of a camera module according to an embodiment.
Figure 2:
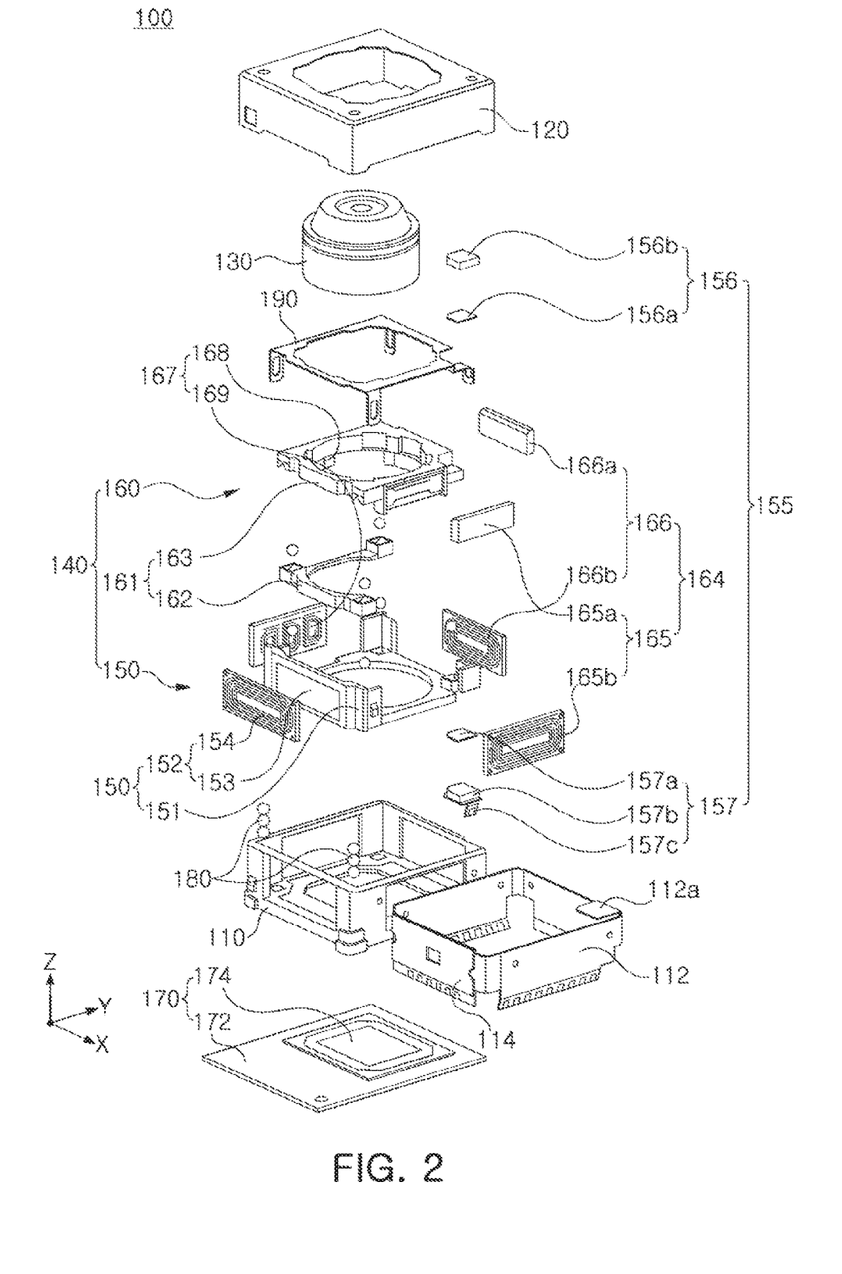
FIG. 2 is a schematic, exploded perspective view of a camera module according to an embodiment.

FIG. 1 is a perspective view of a camera module according to an embodiment, while FIG. 2 is a schematic, exploded perspective view of a camera module according to an embodiment.

With reference to FIGS. 1 and 2, a camera module 100 according to an embodiment includes a housing 110, a shield case 120, a lens barrel 130, a lens driving device 140, and an image sensor unit 170.

The housing 110 includes an internal space in which the lens barrel 130 and the lens driving device 140 are accommodated. In an embodiment, the housing 110 has a hexahedral form having six substantially open surfaces. In addition, the housing 110 may be formed using a plastic material. In an embodiment, a bottom surface of the housing 110 is open for the image sensor unit 170, while four side surfaces of the housing 110 may be open to allow the lens driving device 140 to be disposed therein.

The shield case 120 is combined with the housing 110 so as to surround an external surface of the housing 110 and performs the function of protecting an internal component of the camera module 100. In addition, the shield case 120 may also perform the function of blocking electromagnetic waves. In an embodiment, the shield case 120 blocks electromagnetic waves so that electromagnetic waves generated in the camera module 100 may not affect other electronic components in a portable electronic device. In addition, various electronic components are mounted in portable electronic devices, in addition to the camera module 100. Thus, the shield case 120 may block electromagnetic waves so that electromagnetic waves generated in the electronic components do not affect the camera module 100.

The shield case 120 may be formed using a metal and may be grounded by a ground pad (not illustrated) provided on a printed circuit board 174 of an image sensor unit 170 to be subsequently described, thereby blocking electromagnetic waves.

However, a shield case is not limited thereto, and the shield case 120 may also be formed of a plastic injection molded product. In this case, a conductive paint may be coated on an internal surface of the shield case 120, or a conductive film or a conductive tape may be attached to the internal surface of the shield case 120, thereby blocking electromagnetic waves. In this case, conductive epoxy may be used as the conductive paint, but the conductive paint is not limited thereto. Various materials known in the art having conductivity may be used as the conductive paint.

The lens barrel 130 may have a hollow cylindrical form to accommodate lenses capturing an image of a subject therein. The lenses are mounted in the lens barrel 130 in an optical axis (Z-axis) direction.

The lenses are provided in an amount required, according to a design of the lens barrel 130, while each of the lenses has optical characteristics, such as the same or a different refractive index.

The lens driving device 140 is provided as a device that moves the lens barrel 130. In an embodiment, the lens driving device 140 moves the lens barrel 130 in the optical axis (Z-axis) direction, thereby focusing, and moves the lens barrel 130 in a direction perpendicular to an optical axis (Z-axis), thereby correcting movement when a still image or video footage is captured.

The lens driving device 140 includes a focusing unit 150 for focusing and a movement correction unit 160 correcting movement.

Detailed descriptions of the focusing unit 150 and the movement correction unit 160 will be subsequently described.

The image sensor unit 170 converts light incident through the lens barrel 130 into an electrical signal.

In an embodiment, the image sensor unit 170 includes an image sensor 172 and a printed circuit board 174 and may further include an infrared light filter (not illustrated).

The image sensor 172 is mounted on the printed circuit board 174. The infrared light filter (not illustrated) plays a role in preventing light in the infrared light region of the visible spectrum, from the light incident through the lens barrel 130, from being incident on the image sensor 172.

The image sensor 172 converts the light incident through the lens barrel 130 into an electrical signal. In an embodiment, the image sensor is a charge-coupled device (CCD) or a complementary metal-oxide semiconductor (CMOS).

The electrical signal converted by the image sensor 172 is output to be an image through a display unit of a portable electronic device.

The image sensor 172 is fixed to the printed circuit board 174 and is electrically connected to the printed circuit board 174 using, for example, wire bonding.

Hereinafter, a lens driving device will be described in more detail with reference to drawings.

Figure 3:
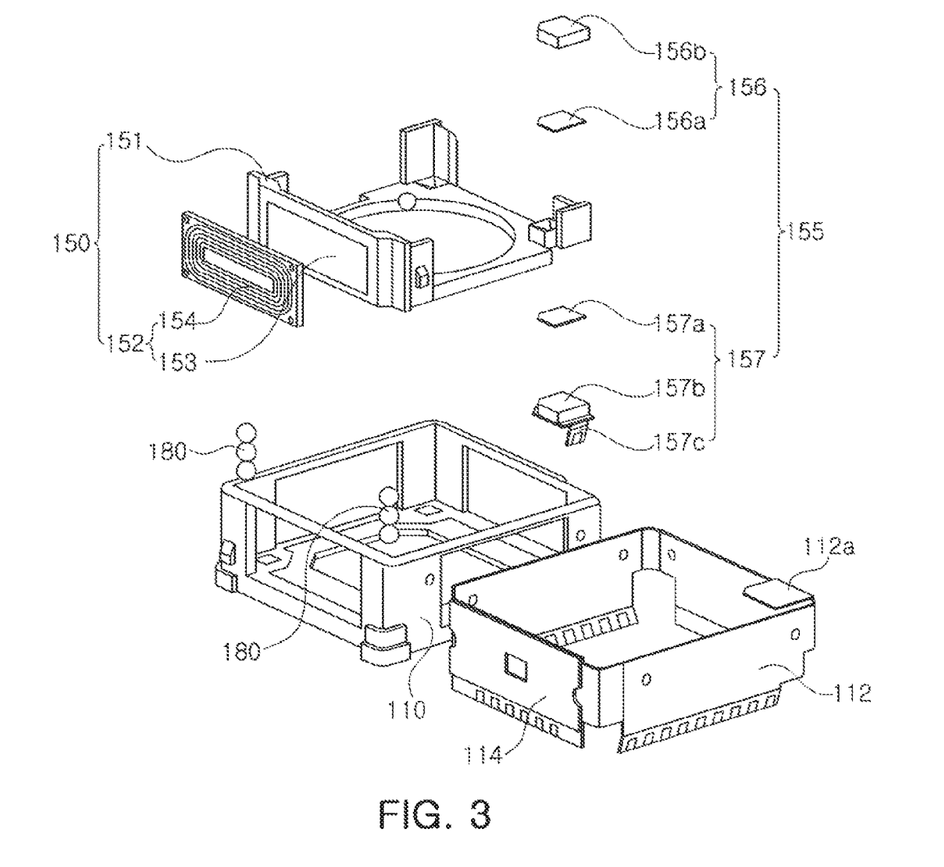
FIG. 3 is an enlarged, exploded perspective view of a focusing unit provided in a camera module according to an embodiment.
Figure 4:
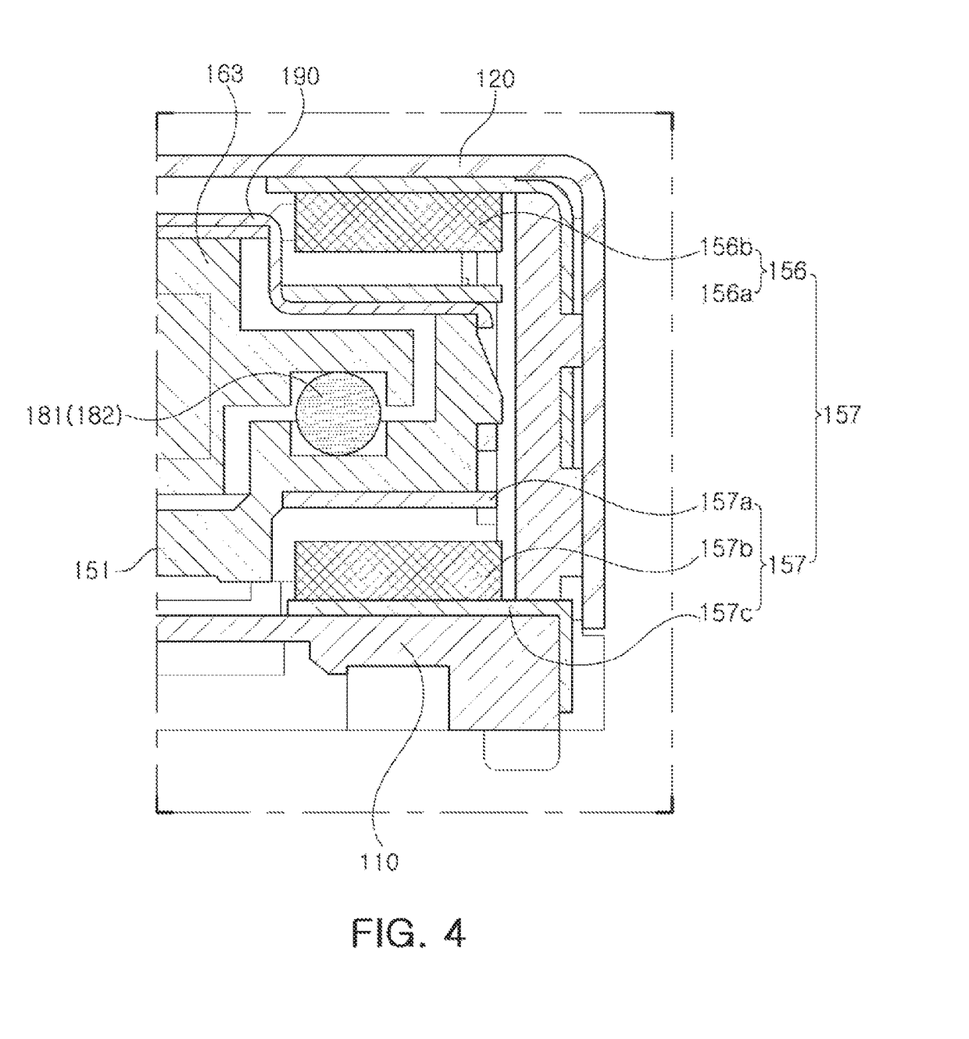
FIG. 4 is a cross-sectional view taken along line A-A' of FIG. 1.

FIG. 3 is an enlarged, exploded perspective view of a focusing unit provided in a camera module according to an embodiment, while FIG. 4 is a cross-sectional view taken along line A-A' of FIG. 1.

With reference to FIGS. 3 and 4, a lens driving device (140, see FIG. 2) moves a lens barrel (130, see FIG. 2), in order to focus an image of a subject.

In an embodiment, a focusing unit 150 moves a lens barrel 130 in an optical axis (Z-axis) direction.

The focusing unit 150 includes a carrier 151 accommodating the lens barrel 130 and a focus driving portion 152 generating driving power to move the lens barrel 130 and the carrier 151 in the optical axis (Z-axis) direction.

The focus driving portion 152 includes a focusing magnet 153 mounted in either the carrier 151 or the housing 110 and a focusing coil 154 disposed to oppose the focusing magnet 153.

The focusing magnet 153 is mounted on the carrier 151. In an embodiment, the focusing magnet 153 may be mounted on a surface of the carrier 151.

The focusing coil 154 is mounted on the housing 110. In an embodiment, the focusing coil 154 may be mounted on the housing 110 by the medium of a substrate 112.

The focusing magnet 153 is a moving member mounted on the carrier 151 and moving together with the carrier 151 in the optical axis (Z-axis) direction. The focusing coil 154 is provided as a fixed member fixed to the housing 110. However, this embodiment is not limited thereto. Mounting positions of the focusing magnet 153 and the focusing coil 154 are interchangeable.

In an embodiment in which power is applied to the focusing coil 154, the carrier 151 may be moved in the optical axis (Z-axis) direction by electromagnetic attraction between the focusing magnet 153 and the focusing coil 154.

Since the lens barrel 130 is accommodated in the carrier 151, the lens barrel 130 is also moved in the optical axis (Z-axis) direction by the movement of the carrier 151.

A rolling member 180 is disposed between the carrier 151 and the housing 110 so that friction between the carrier 151 and the housing 110 may be reduced when the carrier 151 is moved. The rolling member 180 may have a ball form.

The rolling member 180 may be disposed on opposing sides of the focusing magnet 153. In an embodiment, a plurality of rolling members 180 may be disposed to form a single row on each side of the focusing magnet 153.

A focusing yoke 114 is disposed in the housing 110. In an embodiment, the focusing yoke 114 and the focusing magnet 153 are disposed on each side of the focusing coil 15, in order to oppose each other.

Attractive force is applied between the focusing yoke 114 and the focusing magnet 153 in a direction perpendicular to an optical axis (Z-axis). Thus, the rolling member 180 may be maintained in a state of contact with the carrier 151 and the housing 110, through attractive force between the focusing yoke 114 and the focusing magnet 153.

In addition, the focusing yoke 114 also performs a function of allowing magnetic force of the focusing magnet 153 to be focused. Thus, the occurrence of magnetic flux leakage may be reduced. In an embodiment, the focusing yoke 114 and the focusing magnet 153 form a magnetic circuit. In this case, a length of the focusing yoke 114 in the optical axis (Z-axis) direction may be greater than a length of the focusing magnet 153 in the optical axis (Z-axis) direction.

The focusing unit 150 further includes a focus sensing portion 155 disposed in an area not including a planar surface on which the focusing magnet 153 and the focusing coil 154 are mounted. In an embodiment, the focus sensing portion 155 includes a first focus sensing portion 156 disposed on the housing 110 and a second focus sensing portion 157 disposed below the first focus sensing portion 156 to be spaced apart therefrom. "Spaced apart" in this embodiment can mean not in contact with each other. Furthermore, the rolling member 180 provided in a movement correction unit 160 to be subsequently described may be disposed between the first focus sensing portion 156 and the second focus sensing portion 157, as illustrated in more detail in FIG. 3.

Since the first focus sensing portion 156 includes a first focus sensing yoke 156a mounted on the housing 110 and a first focus sensing coil 156b disposed to oppose the first focus sensing yoke 156a.

Furthermore, the second focus sensing portion 157 includes a second focus sensing yoke 157a mounted below the housing 110 and a second focus sensing coil 157b disposed to oppose the second focus sensing yoke 157a.

In addition, the second focus sensing portion 157 may further include a connection substrate 157c connected to the substrate 112 to which the focusing coil 154 is connected. Furthermore, the first focus sensing portion 156 may be connected to a connection portion 112a of the substrate 112.

In the meantime, since the first focus sensing portion 156 is mainly different from the second focus sensing portion 157 in terms of mounting position, only the first focus sensing portion 156 will be described hereinafter, and a detailed description of the second focus sensing portion 157 will be omitted.

The first focus sensing coil 156b may include two or more coils. Inductance of the first focus sensing coil 156b changes according to displacement of the first focus sensing yoke 157a.

In an embodiment, a closed loop control method to detect and provide feedback of a position of the lens barrel 130 is used. Thus, the focus sensing portion 155 is provided for closed loop control.

In more detail, when power of a camera module 100 is turned on, an initial position of the lens barrel 130 is detected by the focus sensing portion 155. The lens barrel 130 is moved from the initial position that was detected to an initially set position. Here, the initial position may refer to a position of the lens barrel 130 in the optical axis direction when power of the camera module 100 is turned on. The initially set position may refer to a position in which focus of the lens barrel 130 becomes infinite.

The lens barrel 130 is moved from the initially set position to a target position by a driving signal of a circuit element.

In a focusing process, the lens barrel 130 may be moved back and forth in the optical axis (Z-axis) direction (in other words, the lens barrel 130 may be moved in both directions).

As such, the focus sensing portion 155 may be mounted in an area not including a planar surface on which the focusing magnet 153 and the focusing coil 154 are mounted, thereby increasing sizes of the focusing magnet 153 and the focusing coil 154.

In other words, the focus sensing portion 155 is mounted in the area not including the planar surface on which the focusing magnet 153 and the focusing coil 154 are mounted, thereby increasing the sizes of the focusing magnet 153 and the focusing coil 154 to correspond to an entirety of a side surface of the housing 110.

Thus, driving power for focusing, that is, driving power generated by the focusing unit 150, may be increased.

Figure 5:
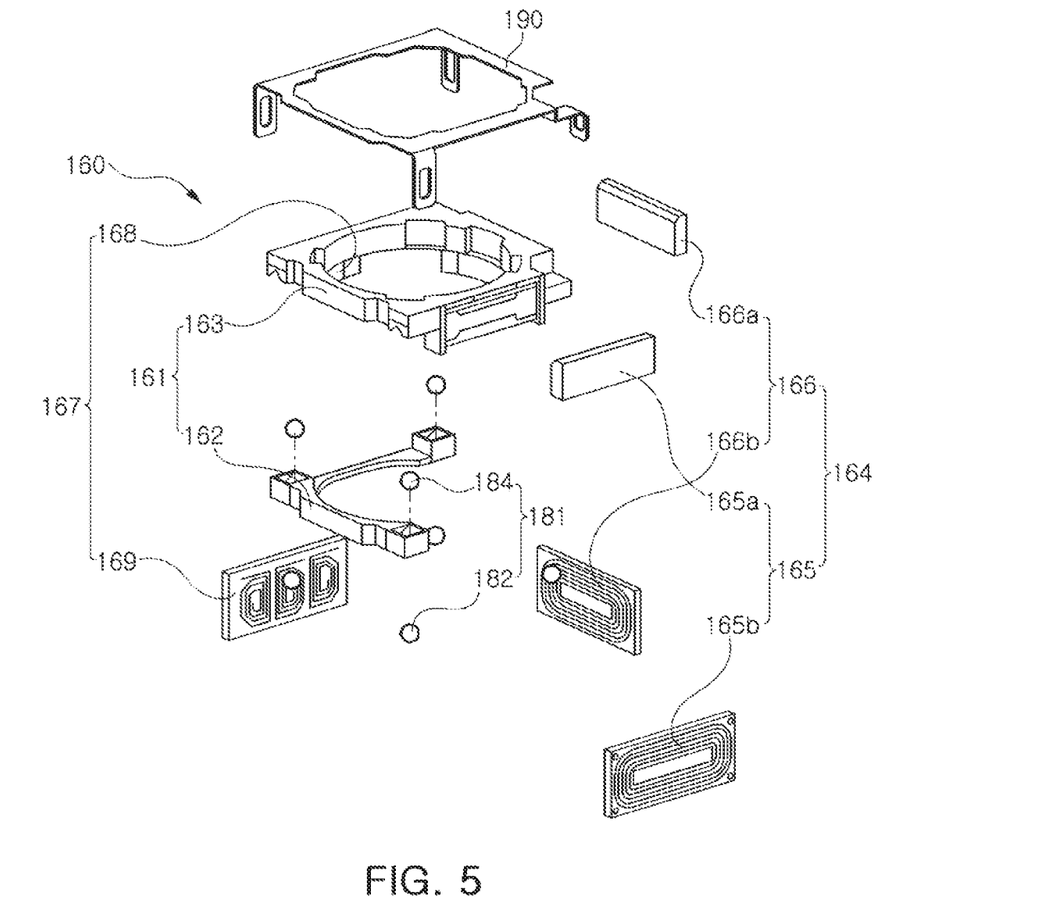
FIG. 5 is an enlarged, exploded perspective view of a movement correction unit provided in a camera module according to an embodiment.

FIG. 5 is an enlarged, exploded perspective view of a movement correction unit provided in a camera module according to an embodiment.

The movement correction unit 160 is used to correct blurriness of an image or shakiness of video footage caused by a factor, such as user hand-shake, when a still image or video footage is captured.

In detail, in an embodiment in which movement occurs due to user hand-shake, and the like, when a still image or video footage is captured, the movement correction unit 160 compensates for the movement by providing relative displacement corresponding to the movement to the lens barrel 130.

In an embodiment, the movement correction unit 160 corrects movement by moving the lens barrel 130 in a direction perpendicular to an optical axis (Z-axis).

With reference to FIG. 5, the movement correction unit 160 includes a guide member 161 guiding movement of the lens barrel 130 and a movement correction driving portion 164 generating driving power, in order to move the guide member 161 in the direction perpendicular to the optical axis (Z-axis).

The guide member 161 includes a frame 162 and a lens holder 163. The frame 162 and the lens holder 163 are inserted into a carrier 151 to be disposed in the optical axis (Z-axis) direction and guide movement of the lens barrel 130.

The frame 162 and the lens holder 163 include a space into which the lens barrel 130 is inserted. The lens barrel 130 is fixed to the lens holder 163.

The frame 162 and the lens holder 163 are moved in the carrier 151 in the direction perpendicular to the optical axis (Z-axis) by driving power generated in the movement correction driving portion 164.

The movement correction driving portion 164 includes a first movement correction driving portion 165 configured to generate driving power in a first axis (X-axis) direction perpendicular to the optical axis (Z-axis) and a second movement correction driving portion 166 configured to generate driving power in a second axis (Y-axis) direction perpendicular to both an optical axis (Z-axis) and a first axis (X-axis).

The first movement correction driving portion 165 generates driving power in the first axis (X-axis) direction perpendicular to the optical axis (Z-axis). The second movement correction driving portion 166 generates driving power in the second axis (Y-axis) direction perpendicular to the first axis (X-axis).

Here, the second axis (Y axis) refers to an axis perpendicular to both the optical axis (Z-axis) and the first axis (X-axis).

The first movement correction driving portion 165 is disposed to meet the second movement correction driving portion 166 at a right angle on a planar surface perpendicular to the optical axis (Z-axis). In an embodiment, the first movement correction driving portion 165 is disposed to meet the second movement correction driving portion 166 at a right angle on a planar surface perpendicular to the optical axis (Z-axis).

In an embodiment, the first movement correction driving portion 165 includes a first movement correction magnet 165a mounted on either the frame 162 or the housing 110 and a first movement correction coil 165b disposed to oppose the first movement correction magnet 165a.

The second movement correction driving portion 166 includes a second movement correction magnet 166a mounted on either the frame 162 or the housing 110 and a second movement correction coil 166b disposed to oppose the second movement correction magnet 166a.

The first movement correction magnet 165a and the second movement correction magnet 166a are mounted in the lens holder 163. The first movement correction coil 165b and the second movement correction coil 166b disposed to oppose the first movement correction magnet 165a and the second movement correction magnet 166a are mounted on the housing 110. In an embodiment, the first movement correction coil 165b and the second movement correction coil 166b are mounted on the housing 110 by the medium of a substrate 112.

The first movement correction magnet 165a and the second movement correction magnet 166a are provided as moving members moving together with the lens holder 163 in a direction perpendicular to the optical axis (Z-axis). The first movement correction coil 165b and the second movement correction coil 166b are provided as a fixed member fixed to the housing 110. However, the first movement correction coil 165b and the second movement correction coil 166b are not limited thereto. Positions of the first movement correction magnet 165a and the second movement correction magnet 166a are interchangeable with those of the first movement correction coil 165b and the second movement correction coil 166b.

The movement correction unit 160 further includes a movement correction sensing sensor portion 167 including a movement correction sensing yoke 168 mounted in the lens holder 163 and a movement correction sensing coil 169 disposed to oppose the movement correction sensing yoke 168.

In an embodiment, the movement correction sensing sensor portion 167 is disposed on a planar surface meeting a surface of the carrier 151 on which the focusing magnet 153 is mounted, at a right angle.

The movement correction sensing coil 169 is mounted on the housing 110 by the medium of the substrate 112. In other words, the movement correction sensing coil 169 is provided as a fixed member, while the movement correction sensing yoke 168 is provided as a moving member.

A lens driving device 140, according to an embodiment, uses a closed loop control method to detect and provide feedback of a position of the lens barrel 130 in a process of correcting movement. To this end, the movement correction sensing sensor portion 167 described above is provided.

In more detail, when power of a camera module 100 is turned on, an initial position of the lens barrel 130 is detected by the movement correction sensing sensor portion 167. The lens barrel 130 is moved from an initial position that was detected to an initially set position.

Here, the initially set position may refer to a central position of a movable range thereof in the first axis (X-axis) direction and a central position of a movable range thereof in the second axis (Y-axis) direction. In terms of a mechanism, the initially set position may refer to a central portion of the carrier 151 in which the movement correction unit 160 is accommodated in the first axis (X-axis) direction and a central portion thereof in the second axis (Y-axis) direction.

In an embodiment, rolling members 181 supporting the movement correction unit 160 are provided. The rolling members 181 guide the frame 162 and the lens holder 163 in a process of correcting movement. In addition, rolling members 181 maintain an interval between the carrier 151, the frame 162, and the lens holder 163.

Rolling members 181 include a first rolling member 182 and a second rolling member 184.

The first rolling member 182 guides movement of the movement correction unit 160 in the first axis (X-axis) direction, while the second rolling member 184 guides movement of the movement correction unit 160 in the second axis (Y-axis) direction.

The first rolling member 182 is rolled in the first axis (X-axis) direction, in an embodiment in which driving power is generated in the first axis (X-axis) direction. Thus, the first rolling member 182 guides movement of the frame 162 and the lens holder 163 in the first axis (X-axis) direction.

In addition, the second rolling member 184 is rolled in the second axis (Y-axis) direction, in an embodiment in which driving power is generated in the second axis (Y-axis) direction. Thus, the second rolling member 184 guides movement of the lens holder 163 in the second axis (Y-axis) direction.

The first rolling member 182 includes a plurality of rolling members disposed between the carrier 151 and the frame 162. The second rolling member 184 includes a plurality of rolling members disposed between the frame 162 and the lens holder 163.

In an embodiment, a stopper 190 is provided to prevent the plurality of rolling members 181, the frame 162, and the lens holder 163 from being released outwardly of the carrier 151 by external impacts (see FIG. 2).

As described above, a focus sensing portion 155 is mounted in an area not including a planar surface on which the focusing magnet 153 and the focusing coil 154 are mounted, thereby increasing sizes of the focusing magnet 153 and the focusing coil 154.

Thus, driving power for focusing, that is, driving power generated by the focusing unit 150, may be increased.

Hereinafter, the camera module according to another embodiment will be described with reference to drawings.

Figure 6:
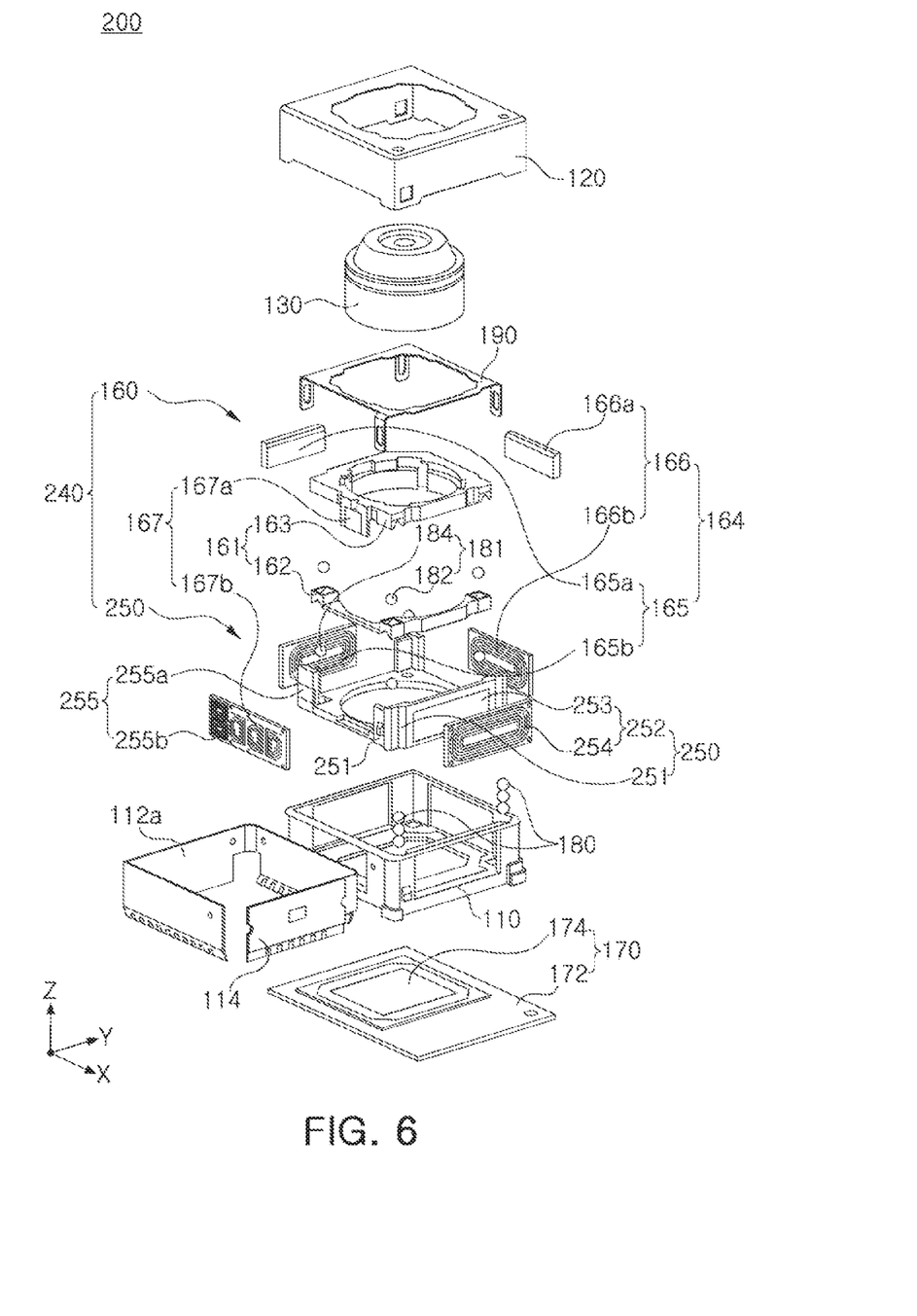
FIG. 6 is an exploded perspective view of a camera module according to another embodiment.
Figure 7:
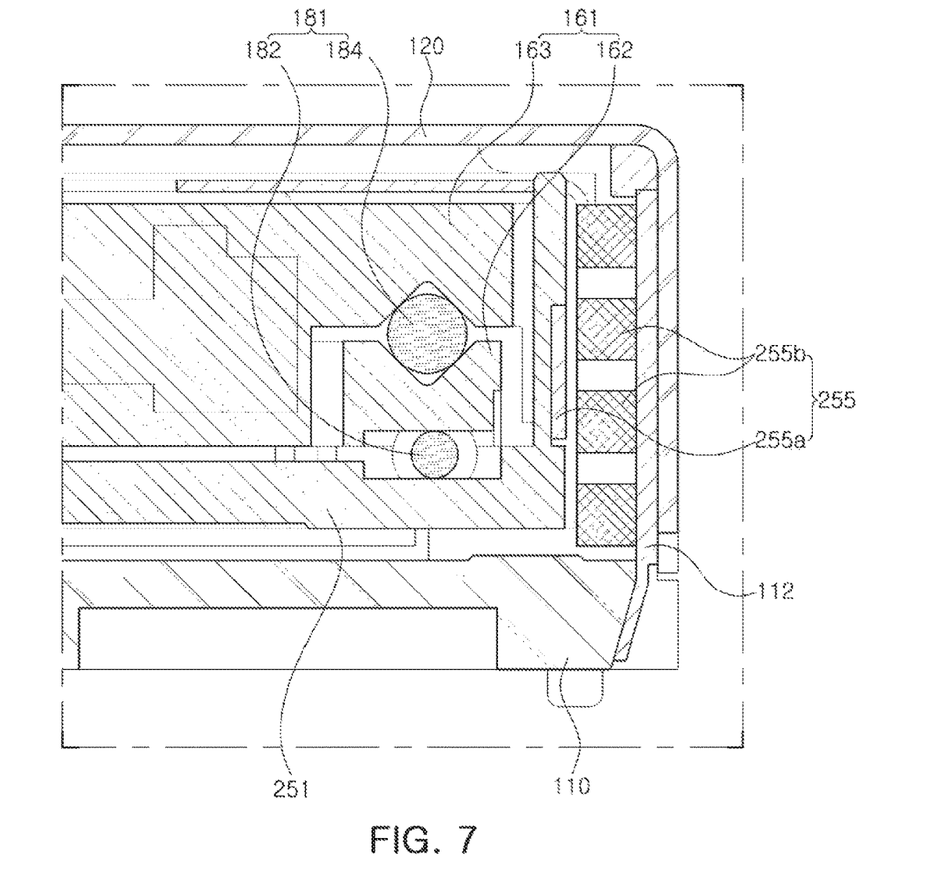
FIG. 7 is a cross-sectional view of a camera module according to another embodiment.

FIG. 6 is an exploded perspective view of a camera module according to an embodiment, while FIG. 7 illustrates a camera module according to an embodiment.

FIG. 7 is a cross-sectional view illustrating a mounting position of a focus sensing portion provided in a camera module according to an embodiment.

With reference to FIGS. 6 and 7, a camera module 200 includes a housing 110, a shield case 120, a lens barrel 130, a lens driving device 240, and an image sensor unit 170.

Since the housing 110, the shield case 120, the lens barrel 130, and the image sensor unit 170 are substantially the same as components described above, detailed descriptions will be omitted.

In addition, the lens driving device 240 is a device moving the lens barrel 130. In an embodiment, the lens driving device 240 moves the lens barrel 130 in an optical axis (Z-axis) direction, thereby focusing and moves the lens barrel 130 in a direction perpendicular to an optical axis (Z-axis), thereby correcting movement when a still image or video footage is captured.

The lens driving device 240 includes a focusing unit 250 for focusing and a movement correction unit 160 for correcting movement.

Since the movement correction unit 160 is substantially the same as components described above, detailed descriptions thereof will be omitted.

Furthermore, since the focusing unit 250 is the same as components described above, except for the focus sensing portion 255, detailed descriptions thereof will be omitted.

The focus sensing portion 255 includes a focus sensing yoke 255a disposed to be fixed to the carrier 251 and a focus sensing coil 255b disposed to oppose the focus sensing yoke 255a.

The focus sensing portion 255 is disposed on a planar surface meeting a planar surface on which a focusing magnet 253 and a focusing coil 254 are mounted, at a right angle. In an embodiment, a movement correction sensing sensor portion 167 of the movement correction unit 160 is disposed to be coplanar with the focus sensing portion 255 of the focusing unit 250.

In an embodiment, the focus sensing yoke 255a is mounted in the carrier 251, while a movement correction sensing yoke 167a may be mounted on a frame 162. In addition, the focus sensing coil 255b and a movement correction sensing coil 167b are fixed to the housing 110 by the medium of a substrate 112.

As described above, the focus sensing portion 255 is mounted in an area not including a planar surface on which the focusing magnet 253 and the focusing coil 254 are mounted, thereby increasing sizes of the focusing magnet 253 and the focusing coil 254.

Thus, driving power for focusing, that is, driving power generated by the focusing unit 250, may be increased.

As set forth above, according to embodiments of the description, driving power may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit were to be combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a lens barrel;

a lens driving device comprising a focusing unit configured to move the lens barrel in a substantially optical axis direction and a movement correction unit configured to move the lens barrel in a direction substantially perpendicular to the optical axis direction; and a housing accommodating the lens barrel and the lens driving device, wherein the focusing unit comprises a carrier accommodating the lens barrel, a focusing magnet mounted on the carrier or the housing, a focusing coil opposing the focusing magnet, a focus sensing portion comprising a focus sensing yoke and a focus sensing coil opposing the focus sensing yoke, and the focus sensing portion is disposed in an area not including a substantially planar surface on which the focusing magnet and the focusing coil are mounted.

2. The camera module of claim 1, wherein the focus sensing portion is disposed on a substantially planar surface configured to meet a substantially planar surface on which the focusing magnet and the focusing coil are mounted, at substantially a right angle.

3. The camera module of claim 2, wherein the movement correction unit comprises a movement correction sensing portion comprising a movement correction sensing yoke and a movement correction sensing coil disposed to oppose the movement correction sensing yoke.

4. The camera module of claim 3, wherein the focus sensing portion is substantially coplanar with the movement correction sensing portion.

5. The camera module of claim 4, wherein the focus sensing coil comprises two or more coil portions.

6. The camera module of claim 1, wherein the focus sensing yoke and the focus sensing coil oppose each other in the substantially optical axis direction.

7. The camera module of claim 6, wherein the focus sensing portion comprises a first focus sensing portion disposed in an upper portion of the housing and a second focus sensing portion, spaced apart from the first focus sensing portion, and below the first focus sensing portion.

8. The camera module of claim 7, further comprising a rolling member disposed between the first focus sensing portion and the second focus sensing portion.

9. The camera module of claim 6, wherein the focus sensing portion further comprises a connection substrate connected to a substrate connected to the focusing coil.

10. The camera module of claim 1, wherein the movement correction unit comprises a guide member configured to guide movement of the lens barrel and a movement correction driving portion configured to move the guide member in a direction substantially perpendicular to an optical axis.

11. The camera module of claim 10, wherein the guide member comprises a frame mounted in the carrier and a lens holder mounted in the lens barrel.

12. The camera module of claim 11, wherein the movement correction driving portion comprises a first movement correction driving portion configured to generate driving power in a first axis direction substantially perpendicular to the optical axis and a second movement correction driving portion configured to generate driving power in a second axis direction substantially perpendicular to both the optical axis and a first axis.

13. The camera module of claim 12, wherein the first movement correction driving portion comprises a first movement correction magnet mounted on the frame or the housing, and a first movement correction coil opposing the first movement correction magnet.

14. The camera module of claim 12, wherein the second movement correction driving portion comprises a second movement correction magnet mounted on the frame or the housing and a second movement correction coil opposing the second movement correction magnet.

15. The camera module of claim 11, wherein the movement correction unit further comprises rolling members configured to guide the frame and the lens holder.

16. A lens driving device, comprising:
a focusing unit configured to move a lens barrel in a substantially optical axis direction; and
a movement correction unit configured to move the lens barrel in a direction substantially perpendicular to the optical axis direction,
wherein the focusing unit comprises a carrier accommodating the lens barrel, a focusing magnet mounted on a housing accommodating the carrier or the carrier, a focusing coil opposing the focusing magnet, a focus sensing portion comprising a focus sensing yoke and a focus sensing coil opposing the focus sensing yoke, and the focus sensing portion is disposed in an area not including a substantially planar surface on which the focusing magnet and the focusing coil are mounted.

17. The lens driving device of claim 16, wherein the focus sensing portion is disposed adjacent to the substantially planar surface on which the focusing magnet and the focusing coil are mounted.

18. The lens driving device of claim 17, wherein the focus sensing portion is disposed on a substantially planar surface configured to meet the substantially planar surface on which the focusing magnet and the focusing coil are mounted, at substantially a right angle.

19. The lens driving device of claim 17, wherein the focus sensing portion is substantially coplanar with the movement correction sensing portion.

20. The lens driving device of claim 17, wherein the focus sensing coil comprises two or more coil portions.

* * * * *